United States Patent
Zhou et al.

(10) Patent No.: US 11,463,346 B2
(45) Date of Patent: Oct. 4, 2022

(54) DATA PROCESSING METHOD, DEVICE, AND SYSTEM

(71) Applicant: Huawei Technologies Co., Ltd., Shenzhen (CN)

(72) Inventors: Yan Zhou, Shanghai (CN); Han Zhou, Shanghai (CN); Geng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/163,985

(22) Filed: Feb. 1, 2021

(65) Prior Publication Data
US 2021/0160167 A1 May 27, 2021

Related U.S. Application Data

(63) Continuation of application No. PCT/CN2019/098509, filed on Jul. 31, 2019.

(30) Foreign Application Priority Data

Aug. 1, 2018 (CN) .......................... 201810864192.9

(51) Int. Cl.
*H04L 45/122* (2022.01)
*H04L 47/11* (2022.01)
(Continued)

(52) U.S. Cl.
CPC ............ *H04L 45/122* (2013.01); *H04L 45/38* (2013.01); *H04L 47/11* (2013.01); *H04L 47/122* (2013.01); *H04L 47/20* (2013.01); *H04L 69/22* (2013.01)

(58) Field of Classification Search
CPC ....... H04L 45/122; H04L 45/38; H04L 47/11; H04L 47/122; H04L 47/20; H04L 69/22;
(Continued)

(56) References Cited

U.S. PATENT DOCUMENTS 9,094,853 B2\* 7/2015 Ghanadan ............. H04L 41/082
2007/0028001 A1\* 2/2007 Phillips ............... H04L 43/0811
709/230
(Continued)

FOREIGN PATENT DOCUMENTS

CN 1949913 A 4/2007
CN 102378382 A 3/2012
(Continued)

OTHER PUBLICATIONS

Shiang, H., et al., "Quality-aware Video Streaming over Wireless Mesh Networks with Optimal Dynamic Routing and Time Allocation," Signals, Systems and Computers, 2006.ACSSC"06. Fortieth Asiloma R Conference on, IEEE, PI, Oct. 1, 2006, 6 pages.

*Primary Examiner* — Mohamed A Kamara
(74) *Attorney, Agent, or Firm* — Conley Rose, P.C.

(57) ABSTRACT

A data processing method, a device, and a system, for performing different processing on data packets of varying degrees of importance in a same service flow, where the data processing method includes: A first device receiving a first data packet from a third device, where the first data packet carries transmission requirement indication information of the first data packet, where the first device is any intermediate device between a source device and a target device that correspond to the first data packet, and where the third device is a previous-hop device adjacent to the first device on a transmission path from the source device to the target device; the first device determining, based on the transmission requirement indication information of the first data packet, a processing policy corresponding to the first data packet; and the first device processing the first data packet according to the processing policy.

20 Claims, 8 Drawing Sheets

(51) Int. Cl.
*H04L 47/122* (2022.01)
*H04L 45/00* (2022.01)
*H04L 47/20* (2022.01)
*H04L 69/22* (2022.01)

(58) Field of Classification Search
CPC ....... H04L 45/127; H04L 45/12; H04L 45/20; H04L 47/24; H04L 45/302; H04L 45/306; H04W 40/24; H04W 28/0268; H04W 28/24; H04W 72/1242; H04N 21/64792
See application file for complete search history.

(56) References Cited

U.S. PATENT DOCUMENTS

| | | | |
|---|---|---|---|
| 2007/0086341 | A1 | 4/2007 | Ye |
| 2009/0219937 | A1* | 9/2009 | Liu ................... H04L 47/31 370/392 |
| 2013/0148605 | A1 | 6/2013 | Jin |
| 2014/0307554 | A1 | 10/2014 | Basso et al. |
| 2017/0054688 | A1* | 2/2017 | Bhattacharjee ....... H04L 45/306 |

FOREIGN PATENT DOCUMENTS

| | | |
|---|---|---|
| CN | 103813469 A | 5/2014 |
| CN | 103857052 A | 6/2014 |
| CN | 104104620 A | 10/2014 |
| CN | 106775961 A | 5/2017 |
| CN | 107196807 A | 9/2017 |
| CN | 108174239 A | 6/2018 |
| WO | 2013143564 A1 | 10/2013 |

\* cited by examiner

| Bit value | Transmission delay requirement | Sequence number | Information about a device that is to perform deduplication |
|---|---|---|---|
| Identifier of an intermediate device 1 | | Time parameter 1 | |
| Identifier of an intermediate device 2 | | Time parameter 2 | |
| ... | | ... | |

DATA PROCESSING METHOD, DEVICE, AND SYSTEM

CROSS-REFERENCE TO RELATED APPLICATIONS

This application is a continuation of International Patent Application No. PCT/CN2019/098509, filed on Jul. 31, 2019, which claims priority to Chinese Patent Application No. 201810864192.9, filed on Aug. 1, 2018. The disclosures of the aforementioned applications are hereby incorporated by reference in their entireties.

TECHNICAL FIELD

This application relates to the field of communications technologies, and in particular, to a data processing method, a device, and a system.

BACKGROUND

In a data transmission process, a current quality of service (QoS) assurance mechanism commonly used in a network includes two mechanisms: an integrated service (IntServ) mechanism and a differentiated service (DiffServ) mechanism.

In the IntServ mechanism, a network reserves resources based on information (for example, a source/destination Internet Protocol (IP) address or a port number) about a service flow, to ensure that the network has sufficient resources to process the service flow. In the DiffServ mechanism, a network schedules service flows based on priorities of the service flows and information (for example, a source/destination IP address or a port number) about the service flows, to ensure that high-priority service flows are preferentially processed.

However, both the IntServ mechanism and the DiffServ mechanism can only provide different QoS assurance for different service flows, and cannot provide different processing on packets of varying degrees of importance in a same service flow. Currently, a same service flow may include data packets of varying degrees of importance. For example, a service flow may include both a data packet of an I-frame and a data packet of a P-frame. In H.264 image encoding and decoding, encoding and decoding are typically performed in a form of the I-frame and the P-frame. The I-frame represents a key frame, and is an entire frame of an image. The P-frame indicates a difference between the frame and a previous frame. During decoding, the difference defined by the current frame needs to be superposed on a previously buffered picture to generate a final picture. In a data transmission process, if the data packet of the I-frame is incomplete or lost, service experience is greatly affected. If the data packet of the P-frame is incomplete or lost, service experience is slightly affected. Therefore, the I-frame is more important than the P-frame.

In this case, if the IntServ mechanism is applied to perform QoS assurance for the service flow, because the I-frame represents a key frame and is an entire frame of the image, the data packet of the I-frame requires a relatively large quantity of resources, and the data packet of the P-frame requires a relatively small quantity of resources. Therefore, if resources are reserved based on the resources required by the data packet of the I-frame, a waste of resources is caused. If resources are reserved based on the resources required by the data packet of the P-frame, a network cannot ensure transmission of the data packet of the I-frame. If the DiffServ mechanism is applied to perform QoS assurance for the service flow, because the I-frame represents a key frame, a priority of the data packet of the I-frame is higher than a priority of the data packet of the P-frame. Consequently, it is unfair if the I-frame data packet is preferentially scheduled based on priorities of the I-frame and the P-frame. If scheduling is not performed based on priorities of the I-frame and the P-frame, and the P-frame is preferentially scheduled, the network cannot ensure transmission of the data packet of the I-frames.

In conclusion, how to optimize a current QoS assurance mechanism in the network, such that different processing can be performed on data packets of varying degrees of importance in a same service flow is an urgent problem to be resolved currently.

SUMMARY

Embodiments of this application provide a data processing method, a device, and a system, such that different processing can be performed on data packets of varying degrees of importance in a same service flow.

To achieve the foregoing objective, the following technical solutions are used in the embodiments of this application.

According to a first aspect, a data processing method is provided. The data processing method includes: A first device receives a first data packet from a third device. The first data packet carries transmission requirement indication information of the first data packet. The first device is any intermediate device between a source device and a target device that correspond to the first data packet. The third device is a previous-hop device adjacent to the first device on a transmission path from the source device to the target device. The first device determines, based on the transmission requirement indication information of the first data packet, a processing policy corresponding to the first data packet. The first device processes the first data packet according to the processing policy corresponding to the first data packet. In a data transmission process, the first data packet received by the first device carries the transmission requirement indication information of the first data packet, such that the first device may determine, based on the transmission requirement indication information of the first data packet, the processing policy corresponding to the first data packet, and then process the first data packet according to the processing policy corresponding to the first data packet. Therefore, in this embodiment of this application, different processing can be performed on data packets of varying degrees of importance in a same service flow based on the transmission requirement indication information of the first data packet.

In a possible design, the transmission requirement indication information of the first data packet includes a bit value of the first data packet, and the bit value of the first data packet is information used to represent a value of the first data packet.

For example, the bit value of the first data packet may be a sum of bit values of all data in the first data packet, a bit value of data with a highest bit value in the first data packet, a user-defined value used to represent the value of the first data packet, or the like. This is not specifically limited in this embodiment of this application.

In a possible design, that the first device determines, based on the transmission requirement indication information of the first data packet, the processing policy corresponding to the first data packet is: If the bit value of the first data packet is greater than a first threshold, the first device determines that the processing policy corresponding to the first data packet is preferentially scheduling the first data packet. In other words, the first device may preferentially schedule the high-bit-value first data packet, to ensure timeliness of transmission. In this embodiment of this application, preferential scheduling means inserting the received data packet into the forefront of a scheduling queue, such that the data packet can be processed in advance. A general description is provided herein, and details are not described below again.

In a possible design, that the first device determines, based on the transmission requirement indication information of the first data packet, the processing policy corresponding to the first data packet is: If the bit value of the first data packet is greater than a first threshold, the first device determines that the processing policy corresponding to the first data packet is forwarding the first data packet to the second device. The second device is a device with a minimum congestion degree in next-hop devices adjacent to the first device on one or more transmission paths from the first device to the target device. Alternatively, the second device is a next-hop device adjacent to the first device on a target transmission path from the first device to the target device. The target transmission path is a transmission path with a minimum transmission cost in one or more transmission paths from the first device to the target device. In other words, the first device may select a better transmission path for the high-bit-value first data packet, to ensure reliability of transmission.

In a possible design, that the first device determines, based on the transmission requirement indication information of the first data packet, the processing policy corresponding to the first data packet is: If the bit value of the first data packet is greater than a first threshold, the first device determines that the processing policy corresponding to the first data packet is: duplicating the first data packet to obtain a plurality of first data packets, and sending the plurality of first data packets on a plurality of transmission paths; or duplicating the first data packet to obtain a plurality of first data packets, sending the plurality of first data packets on a plurality of transmission paths, and specifying a device that is to perform deduplication on the first data packet on each of the plurality of transmission paths. In other words, the first device may further duplicate the high-bit-value first data packet to obtain the plurality of first data packets, and then transmit the first data packets on the plurality of transmission paths, to ensure reliability of transmission.

In a possible design, that the first device determines, based on the transmission requirement indication information of the first data packet, the processing policy corresponding to the first data packet is: If the bit value of the first data packet is less than a second threshold, and devices on one or more transmission paths between the first device and the target device are congested, the first device determines that the processing policy corresponding to the first data packet is discarding the first data packet. In other words, the first device may discard the first data packet with a low bit value, to reserve a resource for another data packet.

In a possible design, the transmission requirement indication information of the first data packet includes a transmission time parameter of the first data packet, and the transmission time parameter of the first data packet is information used to represent time validity of the first data packet. For example, for a first data packet of a delay-sensitive service, the transmission requirement indication information of the first data packet may include the transmission time parameter of the first data packet.

In a possible design, the transmission time parameter of the first data packet is used to indicate a remaining processing time of the first data packet. Correspondingly, that the first device determines, based on the transmission requirement indication information of the first data packet, the processing policy corresponding to the first data packet is: If the remaining processing time of the first data packet is less than a third threshold and is greater than 0, the first device determines that the processing policy corresponding to the first data packet is preferentially scheduling the first data packet. In other words, the first device may preferentially schedule the first data packet whose remaining processing time is short, to ensure timeliness of transmission.

In a possible design, the transmission time parameter of the first data packet is used to indicate a remaining processing time of the first data packet. Correspondingly, that the first device determines, based on the transmission requirement indication information of the first data packet, the processing policy corresponding to the first data packet is: If the remaining processing time of the first data packet is less than a third threshold and is greater than 0, the first device determines that the processing policy corresponding to the first data packet is forwarding the first data packet to the second device. The second device is a device with a minimum congestion degree in next-hop devices adjacent to the first device on one or more transmission paths from the first device to the target device. Alternatively, the second device is a next-hop device adjacent to the first device on a target transmission path from the first device to the target device, and the target transmission path is a transmission path with a minimum transmission cost in one or more transmission paths from the first device to the target device. In other words, the first device may select a better transmission path for the first data packet whose remaining processing time is short, to ensure reliability of transmission.

In a possible design, the transmission time parameter of the first data packet is used to indicate a remaining processing time of the first data packet. Correspondingly, that the first device determines, based on the transmission requirement indication information of the first data packet, the processing policy corresponding to the first data packet is: If the remaining processing time of the first data packet is not greater than 0 or is not greater than an estimated time, the first device determines that the processing policy corresponding to the first data packet is discarding the first data packet. The estimated time is determined based on a congestion degree of each device on one or more transmission paths between the first device and the target device. In other words, the first device may discard the first data packet whose remaining processing time is insufficient, to reserve a resource for another data packet.

In a possible design, the transmission requirement indication information of the first data packet further includes deduplication information of the first data packet. The deduplication information of the first data packet includes a sequence number of the first data packet. Alternatively, the deduplication information of the first data packet includes a sequence number of the first data packet and information about a device that is to perform deduplication on the first data packet.

In a possible design, that the first device determines, based on the transmission requirement indication information of the first data packet, the processing policy corresponding to the first data packet is: If information, about the device that is to perform deduplication on the first data packet, included in the deduplication information of the first data packet is information about the first device, the first device determines that the processing policy corresponding to the first data packet is performing deduplication on the first data packet based on the sequence number of the first data packet. In other words, if the first device learns that the specified device that is to perform deduplication is the first device, the first device may perform deduplication based on the sequence number of the first data packet.

In a possible design, the data processing method further includes: The first device obtains information and the congestion degree of each device on one or more transmission paths between the first device and the target device. The first device establishes a correspondence between the information and the congestion degree of each device on one or more transmission paths between the first device and the target device. According to this solution, the first device may learn of the correspondence between the information and the congestion degree of each device on one or more transmission paths between the first device and the target device. Further, in a subsequent transmission process of the first data packet, the first device may determine the corresponding data processing policy based on the correspondence and the transmission requirement indication information of the first data packet.

In a possible design, that the first device obtains the information and the congestion degree of each device on one or more transmission paths between the first device and the target device is: The first device receives, from a control device, the congestion degree of each device on one or more transmission paths between the first device and the target device. Alternatively, the first device receives, from each device on one or more transmission paths between the first device and the target device, the congestion degree of each device. According to this solution, the first device may obtain the information and the congestion degree of each device on one or more transmission paths between the first device and the target device.

According to a second aspect, a data processing method is provided. The data processing method includes: A third device determines transmission requirement indication information of a to-be-sent first data packet. The transmission requirement indication information of the first data packet is used to determine, in a transmission process of the first data packet, a processing policy corresponding to the first data packet. The third device sends the first data packet to a first device. The first data packet carries the transmission requirement indication information of the first data packet. The first device is any intermediate device between a source device and a target device that correspond to the first data packet. The third device is a previous-hop device adjacent to the first device on a transmission path from the source device to the target device. In a data transmission process, the first data packet sent by the third device to the first device carries the transmission requirement indication information of the first data packet. The transmission requirement indication information of the first data packet is used to determine, in the transmission process of the first data packet, the processing policy corresponding to the first data packet. Then, after determining, based on the transmission requirement indication information of the first data packet, the processing policy corresponding to the first data packet, the first device may process the first data packet according to the processing policy corresponding to the first data packet. Therefore, according to the data processing method provided in this embodiment of this application, different processing can be performed on data packets of varying degrees of importance in a same service flow based on the transmission requirement indication information of the first data packet.

In a possible design, the third device is the source device corresponding to the first data packet. Correspondingly, that the third device determines the transmission requirement indication information of the first data packet is: The source device determines a bit value of the first data packet based on a data type of the first data packet. The data type of the first data packet may be, for example, a P-frame data packet, an I-frame data packet, or an I-frame+P-frame data packet. This is not specifically limited in this embodiment of this application.

For example, it is assumed that the predefined bit value of the data packet may be classified into two levels: a high bit value level and a low bit value level. If the first data packet includes only an I-frame (that is, the data type of the first data packet is the I-frame data packet), the source device may determine the bit value of the first data packet as the high bit value level. Alternatively, if the first data packet includes only a P-frame (that is, the data type of the first data packet is the P-frame data packet), the source device may determine the bit value of the first data packet as the low bit value level. Alternatively, if the first data packet includes both an I-frame and a P-frame (that is, the data type of the first data packet is the I-frame+P-frame data packet), the source device may determine the bit value of the first data packet, namely, a bit value of data with a highest bit value in the first data packet, as the high bit value level. Certainly, the high bit value level and the low bit value level may also be respectively represented by corresponding values. For example, the high bit value level corresponds to a first value, and the low bit value level corresponds to a second value, where the first value is greater than the second value. This is not specifically limited in this embodiment of this application.

According to a third aspect, a first device is provided. The first device has a function of implementing the method according to the first aspect. The function may be implemented using hardware, or may be implemented using hardware executing corresponding software. The hardware or the software includes one or more modules corresponding to the function.

According to a fourth aspect, a first device is provided, including a processor and a memory. The memory is configured to store a computer-executable instruction. When the first device runs, the processor executes the computer-executable instruction stored in the memory, such that the first device is enabled to perform the data processing method according to any one of the possible designs of the first aspect.

According to a fifth aspect, a first device is provided, including a processor. The processor is configured to: after being coupled to a memory and reading an instruction in the memory, perform the data processing method according to any one of the possible designs of the first aspect based on the instruction.

According to a sixth aspect, a computer-readable storage medium is provided. The computer-readable storage medium stores an instruction, and when the instruction is run on a computer, the computer is enabled to perform the data processing method according to any one of the possible designs of the first aspect.

According to a seventh aspect, a computer program product including an instruction is provided. When the computer program product runs on a computer, the computer is enabled to perform the data processing method according to any one of the possible designs of the first aspect.

According to an eighth aspect, an apparatus (for example, the apparatus may be a chip system) is provided. The apparatus includes a processor, configured to support a first device in implementing a function in the first aspect, for example, determining, based on transmission requirement indication information of a first data packet, a processing policy corresponding to the first data packet. In a possible design, the apparatus may further include a memory. The memory is configured to store a program instruction and data that are necessary for the first device. When the apparatus is a chip system, the chip system may include a chip, or may include a chip and another discrete device.

For technical effects brought by any one of the designs of the third aspect to the eighth aspect, refer to technical effects brought by different designs of the first aspect. Details are not described herein again.

According to a ninth aspect, a third device is provided. The third device has a function of implementing the method according to the second aspect. The function may be implemented using hardware, or may be implemented using hardware executing corresponding software. The hardware or the software includes one or more modules corresponding to the function.

According to a tenth aspect, a third device is provided, including a processor and a memory. The memory is configured to store a computer-executable instruction. When the third device runs, the processor executes the computer-executable instruction stored in the memory, such that the third device is enabled to perform the data processing method according to any one of the possible designs of the second aspect.

According to an eleventh aspect, a third device is provided, including a processor. The processor is configured to: after being coupled to a memory and reading an instruction in the memory, perform the data processing method according to any one of the possible designs of the second aspect based on the instruction.

According to a twelfth aspect, a computer-readable storage medium is provided. The computer-readable storage medium stores an instruction, and when the instruction is run on a computer, the computer is enabled to perform the data processing method according to any one of the possible designs of the second aspect.

According to a thirteenth aspect, a computer program product including an instruction is provided. When the computer program product runs on a computer, the computer is enabled to perform the data processing method according to any one of the possible designs of the second aspect.

According to a fourteenth aspect, an apparatus (for example, the apparatus may be a chip system) is provided. The apparatus includes a processor, configured to support a third device in implementing a function in the second aspect, for example, determining transmission requirement indication information of a to-be-sent first data packet. In a possible design, the apparatus may further include a memory. The memory is configured to store a program instruction and data that are necessary for the third device. When the apparatus is a chip system, the chip system may include a chip, or may include a chip and another discrete device.

For technical effects brought by any one of the designs of the ninth aspect to the fourteenth aspect, refer to technical effects brought by different designs of the second aspect. Details are not described herein again.

According to a fifteenth aspect, a data transmission system is provided. The data transmission system includes a first device and a third device. The first device is configured to perform steps performed by the first device in the first aspect or the solutions provided in the embodiments of this application. The third device is configured to perform steps performed by the third device in the second aspect or the solutions provided in the embodiments of this application.

These aspects or other aspects in this application may be clearer and intelligible in descriptions in the following embodiments.

DESCRIPTION OF EMBODIMENTS

The following describes technical solutions in embodiments of this application with reference to the accompanying drawings in the embodiments of this application. In the description of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, unless otherwise specified, "a plurality of" in the description of this application means two or more than two. "At least one item (piece) of the following" or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that as network architectures evolve and new service scenarios emerge, the technical solutions provided in the embodiments of this application are also applicable to similar technical problems.

Figure 1:
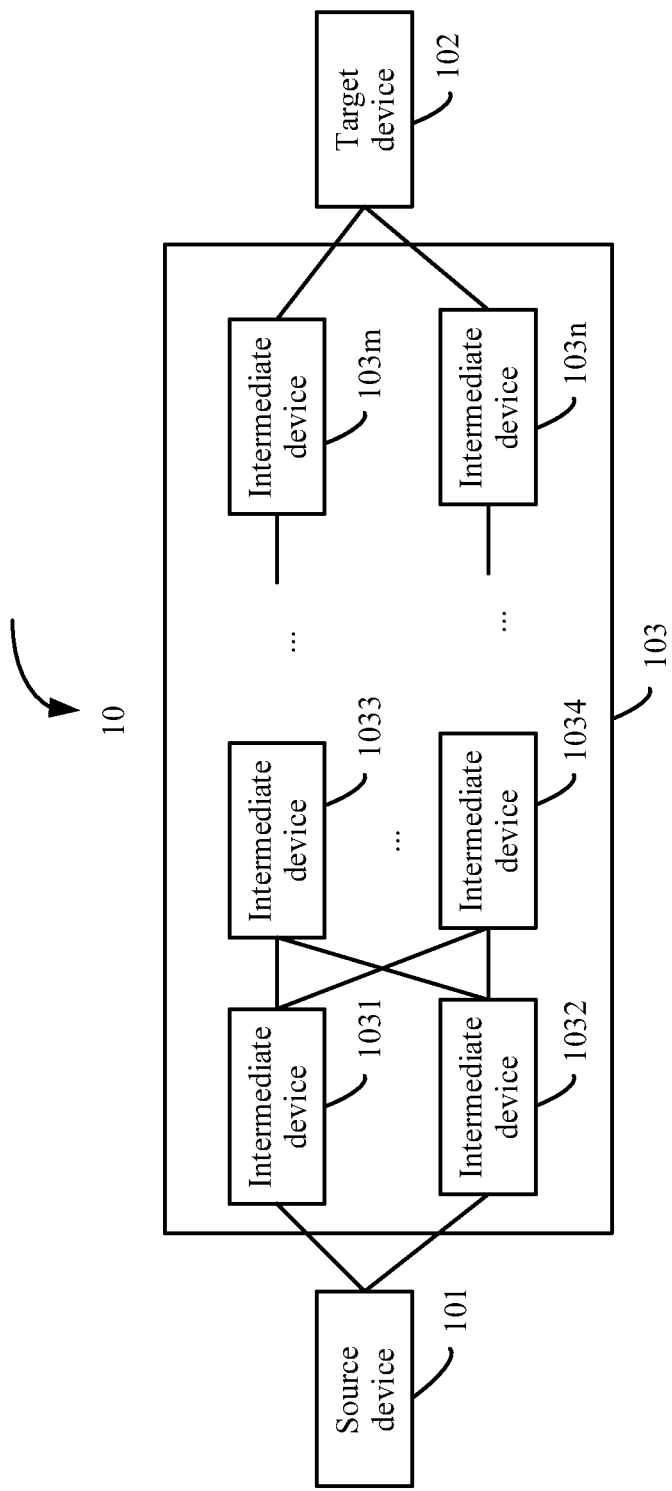
FIG. 1 is a schematic structural diagram of a data transmission system according to an embodiment of this application.

FIG. 1 shows a data transmission system 10 according to an embodiment of this application. The data transmission system 10 includes a source device 101, a target device 102, and one or more intermediate devices 103 between the source device 101 and the target device 102, for example, an intermediate device 1031, an intermediate device 1032, an intermediate device 1033, an intermediate device 1034, . . . , an intermediate device 103m, an intermediate device 103n, and the like in FIG. 1. The following embodiments are described using a first device and a third device as an example. The first device is any intermediate device between the source device and the target device in the data transmission system 10 shown in FIG. 1. The third device is a previous-hop device adjacent to the first device on a transmission path from the source device to the target device in the data transmission system 10 shown in FIG. 1. A general description is provided herein, and details are not described below again.

It should be noted that, in this embodiment of this application, a source device of a data packet is a device that generates the data packet, and a target device is a device corresponding to a destination address to which the data packet needs to be sent. For an Internet Protocol (IP) data packet, after a device generates a data packet, a source IP address of the data packet indicates a source device of the data packet, and a destination address of the data packet indicates a target device of the data packet. Because the transmission path has a transmission direction, a next-hop device of a device on the transmission path from the source device to the target device generally refers to a device adjacent to the device on the transmission path from the device to the target device. A previous-hop device of a device on the transmission path from the source device to the target device generally refers to a previous device adjacent to the device on the transmission path from the source device to the target device, or may be expressed as a next device adjacent to the device on the transmission path from the target device to the source device. For example, in FIG. 1, if the first device is the intermediate device 1031 or the intermediate device 1032 in FIG. 1, a previous-hop device (namely, the third device) adjacent to the first device on a transmission path from the source device 101 to the target device 102 may be the source device 101. Alternatively, if the first device is the intermediate device 1033 in FIG. 1, a previous-hop device (namely, the third device) adjacent to the first device on a transmission path from the source device 101 to the target device 102 may be the intermediate device 1031 or the intermediate device 1032. Alternatively, if the first device is the intermediate device 1034 in FIG. 1, a previous-hop device (namely, the third device) adjacent to the first device on a transmission path from the source device 101 to the target device 102 may be the intermediate device 1031 or the intermediate device 1032. In other words, a next-hop device of the source device 101 may be the intermediate device 1031 or the intermediate device 1032. A next-hop device of the intermediate device 1031 may be the intermediate device 1033 or the intermediate device 1034. A next-hop device of the intermediate device 1032 may be the intermediate device 1033 or the intermediate device 1034. The rest may be deduced by analogy. This is not specifically limited in this embodiment of this application.

In addition, it may be understood that one or more data packets exist in one service flow. The following uses only a first data packet as an example for description.

The third device is configured to: determine transmission requirement indication information of the to-be-sent first data packet; and send the first data packet to the first device. The first data packet carries the transmission requirement indication information of the first data packet.

The first device is configured to: receive the first data packet from the third device; determine, based on the transmission requirement indication information of the first data packet, a processing policy corresponding to the first data packet; and then process the first data packet according to the processing policy corresponding to the first data packet.

Optionally, in this embodiment of this application, the source device may be a terminal, and the target device may be a server. Alternatively, the source device may be a server, and the target device may be a terminal; and so on. This is not specifically limited in this embodiment of this application. The target device in this embodiment of this application is a device corresponding to a destination address carried in the first data packet. A general description is provided herein, and details are not described below again.

Optionally, the terminal in this embodiment of this application may include various handheld devices, vehicle-mounted devices, wearable devices, and computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, a user equipment (UE), a mobile station (MS), a terminal device, relay user equipment, or the like. The relay user equipment may be, for example, a $5^{th}$ generation (5G) residential gateway (RG). For ease of description, in this application, the devices mentioned above are collectively referred to as terminals.

Based on the data transmission system provided in this embodiment of this application, in a data transmission process, the first data packet received by the first device carries the transmission requirement indication information of the first data packet. As such, the first device may determine, based on the transmission requirement indication information of the first data packet, the processing policy corresponding to the first data packet, and then process the first data packet according to the processing policy corresponding to the first data packet. Therefore, in this embodiment of this application, different processing can be performed on data packets of varying degrees of importance in a same service flow based on the transmission requirement indication information of the first data packet.

Optionally, the first device or the third device in this embodiment of this application may be implemented by one device, or may be jointly implemented by a plurality of devices, or may be a functional module in a device. This is not specifically limited in this embodiment of this application. It may be understood that the foregoing function may be a network element in a hardware device, or may be a software function running on dedicated hardware, or may be a virtualization function instantiated on a platform (for example, a cloud platform).

Figure 2:
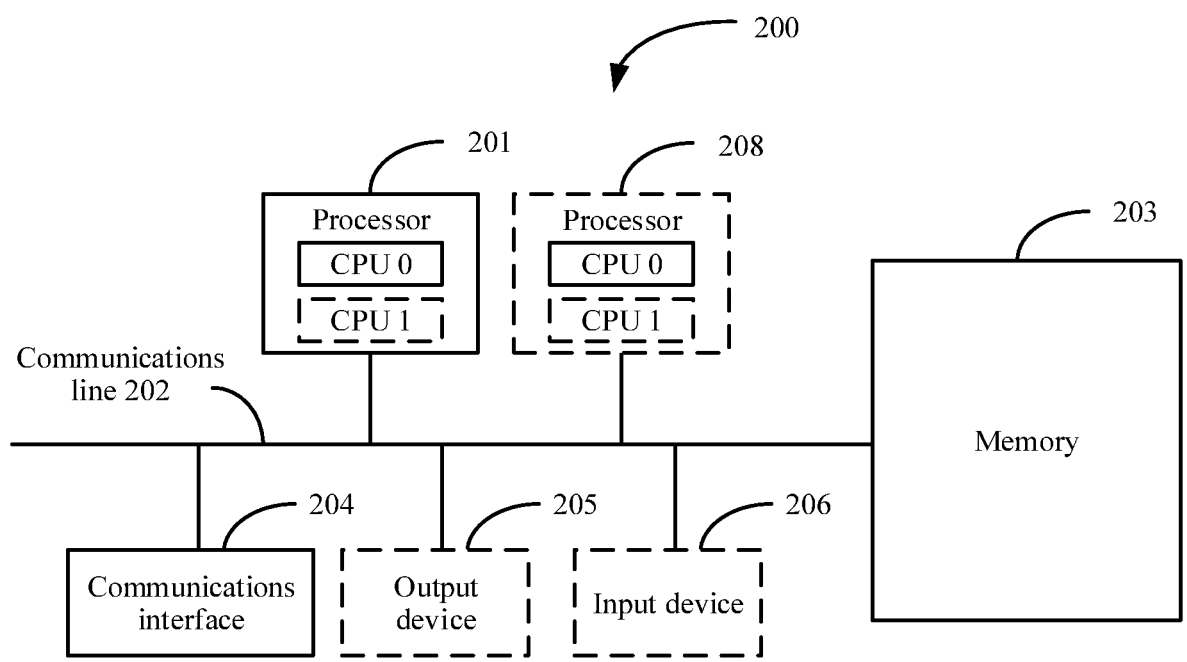
FIG. 2 is a schematic diagram of a hardware structure of a communications device according to an embodiment of this application.

For example, the first device or the third device in this embodiment of this application may be implemented using a communications device in FIG. 2. FIG. 2 is a schematic diagram of a hardware structure of a communications device according to an embodiment of this application. The communications device 200 includes a processor 201, a communications line 202, a memory 203, and one or more communications interfaces (a communications interface 204 is used as an example for description in FIG. 2).

The processor 201 may be a general-purpose central processing unit (CPU), a microprocessor, an application-specific integrated circuit (ASIC), or one or more integrated circuits that are configured to control execution of a program in a solution of this application.

The communications line 202 may include a path, to transmit information between the foregoing components.

The communications interface 204 uses any apparatus such as a transceiver, to communicate with another device or a communications network, for example, the Ethernet, a radio access network (RAN), or a wireless local area network (WLAN).

The memory 203 may be a read-only memory (ROM) or another type of static storage device that can store static information and an instruction, or random-access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, or the like), a magnetic disk storage medium or another magnetic storage device, or any other medium that can be used to carry or store expected program code in a form of an instruction or a data structure and that can be accessed by a computer. However, the memory 203 is not limited thereto. The memory may exist independently, and is connected to the processor through the communications line 202. Alternatively, the memory may be integrated with the processor.

The memory 203 is configured to store a computer-executable instruction for executing the solutions of this application, and the processor 201 controls the execution. The processor 201 is configured to execute the computer-executable instruction stored in the memory 203, to implement a data processing method provided in the following embodiments of this application.

Optionally, the computer-executable instruction in this embodiment of this application may also be referred to as application program code. This is not specifically limited in this embodiment of this application.

During implementation, in an embodiment, the processor 201 may include one or more CPUs, for example, a CPU 0 and a CPU 1 in FIG. 2.

During implementation, in an embodiment, the communications device 200 may include a plurality of processors, for example, the processor 201 and a processor 208 in FIG. 2. Each of the processors may be a single-core (single-CPU) processor or a multi-core (multi-CPU) processor. The processor herein may refer to one or more devices, circuits, and/or processing cores configured to process data (for example, a computer program instruction).

During implementation, in an embodiment, the communications device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (cathode ray tube, CRT) display device, a projector, or the like. The input device 206 communicates with the processor 201, and may receive input from a user in a plurality of manners. For example, the input device 206 may be a mouse, a keyboard, a touchscreen device, a sensing device, or the like.

The foregoing communications device 200 may be a general-purpose device or a dedicated device. During implementation, the communications device 200 may be a desktop computer, a portable computer, a network server, a palmtop computer (e.g., PDA), a mobile phone, a tablet computer, a wireless terminal device, an embedded device, or a device having a structure similar to that in FIG. 2. A type of the communications device 200 is not limited in this embodiment of this application.

The following describes the data processing method provided in the embodiments of this application with reference to FIG. 1 and FIG. 2.

Related descriptions of a transmission network in the following embodiments of this application are first provided as follows:

In this embodiment of this application, a plurality of network nodes in the transmission network may be grouped into a network hierarchy in advance, and the network nodes at the network hierarchy are numbered. For example, for a mobile network, an access device, a core-network user plane network element, a host having a value-added service function, an application server, and the like may be considered as network nodes at a same network hierarchy.

Currently, a network node at a network hierarchy may establish a topological diagram of a complete transmission path of an IP section pair route at the network hierarchy in the following manners.

Figure 3:
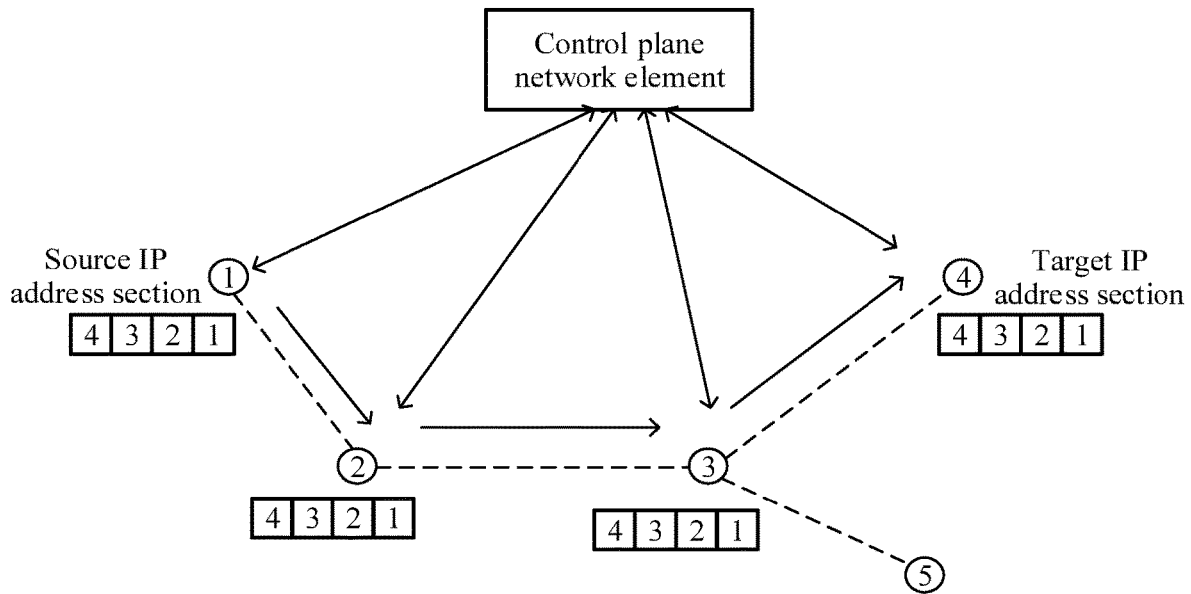
FIG. 3 is a topological diagram 1 of a transmission path according to an embodiment of this application.

Manner 1: If a control plane network element, for example, a software-defined networking (SDN) controller, exists at the network hierarchy, the control plane network element may deliver a transmission path corresponding to an IP section pair to each network node in a node numbering form. For example, as shown in FIG. 3, it is assumed that a transmission path corresponding to an IP section pair: a source IP address section to a target IP address section is a network node 1, a network node 2, a network node 3, and a network node 4. In this case, the control plane network element may deliver numbers 1, 2, 3, and 4 of nodes on the transmission path to the network node 1, the network node 2, the network node 3, and the network node 4, respectively.

It should be noted that FIG. 3 is described merely using an example of one transmission path corresponding to the IP section pair: the source IP address section to the target IP address section. Certainly, the IP section pair: the source IP address section to the target IP address section may alternatively correspond to another transmission path. For a manner of establishing topology of another transmission path, refer to the foregoing transmission path establishment manner. Details are not described herein again.

Figure 4:
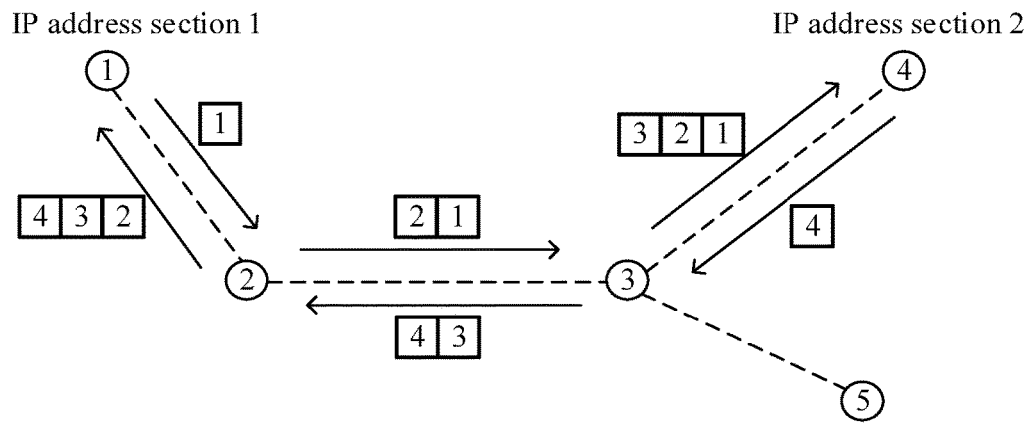
FIG. 4 is a topological diagram 2 of a transmission path according to an embodiment of this application.

Manner 2: All network nodes at the network hierarchy may enable, using a dynamic open shortest path first (OSPF) protocol, each network node to learn a path of an IP section pair. For example, as shown in FIG. 4, if the source IP address section is an IP address section 1, the network node 2 can learn that nodes on the transmission path include the network node 1. If the source IP address section is an IP address section 2, the network node 2 can learn that nodes on the transmission path include the network node 4 and the network node 3. Therefore, through bidirectional learning, the network node 2 can learn and construct a topology of a transmission path of an IP section pair: the IP address section 1 to the IP address section 2, that is, the network node 1, the network node 2, the network node 3, and the network node 4.

The foregoing merely simply shows related current implementation of establishing a topological diagram of a complete transmission path of an IP section pair route at the network hierarchy. For description, refer to an existing implementation. Details are not described herein.

Optionally, in this embodiment of this application, after the network node at the network hierarchy establishes a topological diagram of a complete transmission path of an IP section pair route at the network hierarchy, the network node may obtain transmission quality of the transmission path in the following manners.

For example, for the foregoing manner 1, if the control plane network element exists, each network node at the network hierarchy may report load of the network node to the control plane network element. The control plane network element determines, through computation, a congestion degree of each network node based on information such as the load of the network node or a proportion of forwarding resources, and sends the congestion degree of each network node to the network node at the network hierarchy. For example, in FIG. 3, the network node 1 may report load of the network node 1 to the control plane network element, the network node 2 may report load of the network node 2 to the control plane network element, the network node 3 may report load of the network node 3 to the control plane network element, and the network node 4 may report load of the network node 4 to the control plane network element. Further, the control plane network element may determine a congestion degree of the network node 1 based on the load of the network node 1, a congestion degree of the network node 2 based on the load of the network node 2, a congestion degree of the network node 3 based on the load of the network node 3, and a congestion degree of the network node 4 based on the load of the network node 4. Further, the control plane network element may send the congestion degree of the network node 1, the congestion degree of the network node 2, the congestion degree of the network node 3, and the congestion degree of the network node 4 to the network node 1, the network node 2, the network node 3, and the network node 4. Then, the network node 1 can obtain the congestion degree of the network node 1, the congestion degree of the network node 2, the congestion degree of the network node 3, and the congestion degree of the network node 4 on the transmission path corresponding to the IP section pair: the source IP address section to the target IP address section. The network node 2 can obtain the congestion degree of the network node 1, the congestion degree of the network node 2, the congestion degree of the network node 3, and the congestion degree of the network node 4 on the transmission path corresponding to the IP section pair: the source IP address section to the target IP address section. The network node 3 can obtain the congestion degree of the network node 1, the congestion degree of the network node 2, the congestion degree of the network node 3, and the congestion degree of the network node 4 on the transmission path corresponding to the IP section pair: the source IP address section to the target IP address section. The network node 4 can obtain the congestion degree of the network node 1, the congestion degree of the network node 2, the congestion degree of the network node 3, and the congestion degree of the network node 4 on the transmission path corresponding to the IP section pair: the source IP address section to the target IP address section.

It should be noted that this embodiment of this application is described merely using an example in which the congestion degree of each device on the transmission path shown in FIG. 3 is determined. Certainly, if the IP section pair: the source IP address section to the target IP address section corresponds to another transmission path, for a manner of determining a congestion degree of each device on the other transmission path, refer to the foregoing manner of determining the congestion degree of each device on the transmission path shown in FIG. 3. Details are not described herein again.

It should be noted that the congestion degree of the device in this embodiment of this application may also feed back quality of a link between the devices. In other words, quality of the link may be represented using the congestion degree of the device. This is not specifically limited in this embodiment of this application.

Figure 5:
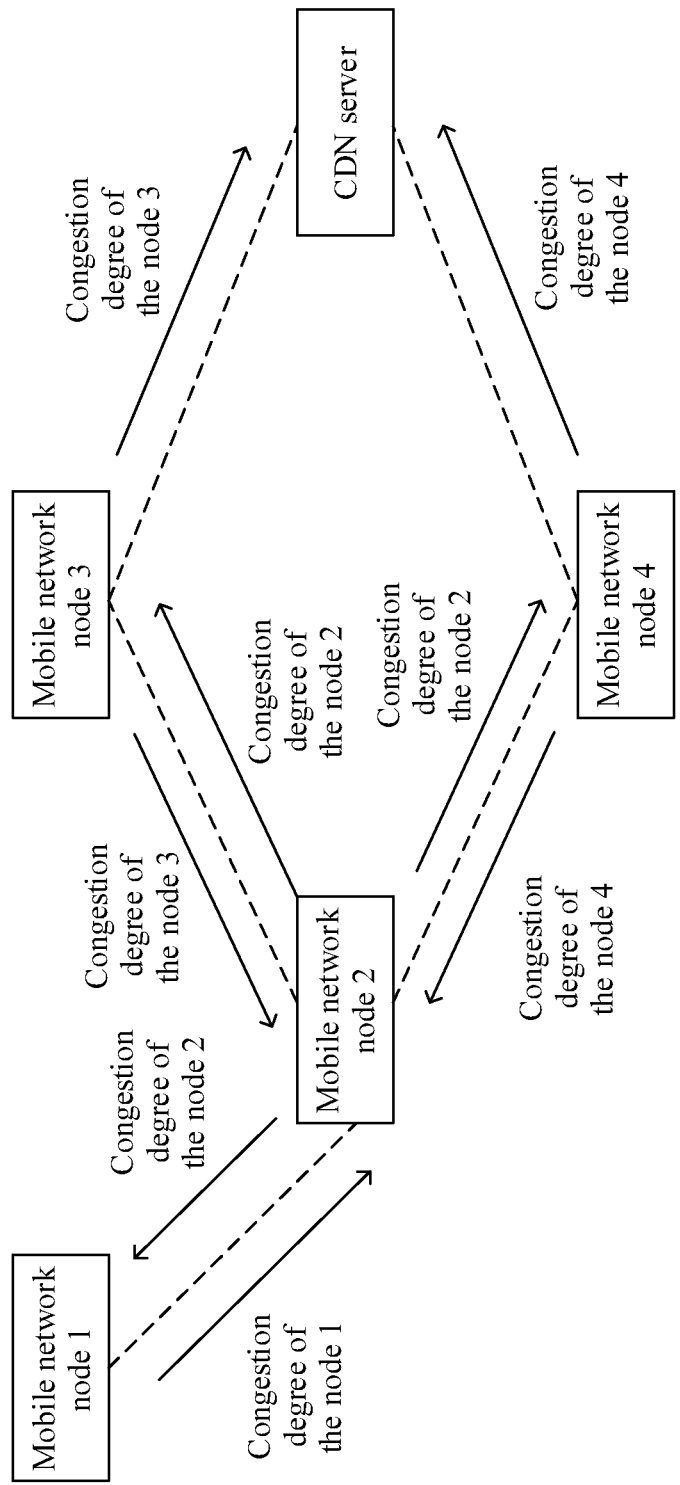
FIG. 5 is a topological diagram 3 of a transmission path according to an embodiment of this application.

Alternatively, for example, for the foregoing manner 2, transmission quality of the transmission path may be determined in a manner of feedback by the network nodes. For example, the network node may determine, through computation, a congestion degree of the network node based on information such as a load of the network node or a proportion of forwarding resources. In addition, the network nodes can notify each other of respective congestion degrees. For example, in a multicast mechanism, the network node at the network hierarchy may notify another network node at the network hierarchy of a congestion degree of the network node in a multicast manner. In this way, the network nodes each may learn congestion degrees of all other network nodes at the network hierarchy. For example, in FIG. 4, after determining a congestion degree of the network node 1, the network node 1 may notify the network node 2, the network node 3, and the network node 4 of the congestion degree of the network node 1. After determining a congestion degree of the network node 2, the network node 2 may notify the network node 1, the network node 3, and the network node 4 of the congestion degree of the network node 2. After determining a congestion degree of the network node 3, the network node 3 may notify the network node 1, the network node 2, and the network node 4 of the congestion degree of the network node 3. After determining a congestion degree of the network node 4, the network node 4 may notify the network node 1, the network node 2, and the network node 3 of the congestion degree of the network node 4. In this way, the network node 1 may learn congestion degrees of the network node 2, the network node 3, and the network node 4. The network node 2 may learn congestion degrees of the network node 1, the network node 3, and the network node 4. The network node 3 may learn congestion degrees of the network node 1, the network node 2, and the network node 4. The network node 4 may learn congestion degrees of the network node 1, the network node 2, and the network node 3. Alternatively, the network node at the network hierarchy may also notify a congestion degree of the network node in a point-to-point manner. To be more specific, the congestion degree of the network node is notified only to a neighboring network node of the network node (for example, one or more of next-hop devices adjacent to the network node or previous-hop devices adjacent to the network node), and is not notified to another network node. In this case, the network node senses only a congestion degree of the neighboring network node. For example, it is assumed that a mobile network node and a content delivery network (CDN) server node are used as a network hierarchy, and a lower-layer IP network and a transmission network are ignored. As shown in FIG. 5, a mobile network node 1 (a node 1) may directly notify a mobile network node 2 (a node 2) of a congestion degree of the node 1. The node 2 may separately notify the node 1, a mobile network node 3 (a node 3), and a mobile network node 4 (a node 4) of a congestion degree of the node 2. The node 3 may separately notify the node 2 and the CDN server of a congestion degree of the node 3. The node 4 may separately notify the node 2 and the CDN server of a congestion degree of the node 4.

Alternatively, for example, for the foregoing manner 1 or manner 2, transmission quality of the transmission path may be determined in a manner of sampling by the network nodes. For example, on the basis of precise clock synchronization, each network node at the network hierarchy adds a timestamp to a header of a received data packet, and the timestamp is transmitted to another network node through the number of the network node. The other network node computes, based on the timestamp, a time of processing the data packet by each network node between the source device and the network node, and maps the processing time to a congestion degree of each network node. Alternatively, all network nodes at the network hierarchy add a time occupied for processing the data packet to the header of the data packet through the number of the network node, and transfer the data packet to another network node. The other network node computes, based on the occupied time, a time of processing the data packet by each network node between the source device and the network node, and maps the processing time to a congestion degree of each network node. This is not specifically limited in this embodiment of this application.

In the foregoing process, each network node at the network hierarchy establishes transmission path topology information shown in Table 1 for an IP section pair route (it may be understood that an IP section pair may correspond to a plurality of valid transmission paths, and the following Table 1 is described merely using an example of a path 1 and a path 2 established by an IP section pair route: a source IP address section 1 to a target IP address section 1).

TABLE 1

| IP section pair (source IP address section 1-target IP address section 1) | | | |
|---|---|---|---|
| Node number (in a sequence of distances) | Congestion degree | Node number (in a sequence of distances) | Congestion degree |
| Path 1: upstream network node list | | Path 1: downstream network node list | |
| 1 | Normal | 5 | Severely congested |
| 2 | Normal (optional) | 7 | Normal (optional) |
| Path 2: upstream network node list | | Path 2: downstream network node list | |
| ... | ... | ... | ... |

Figures 6, 7:
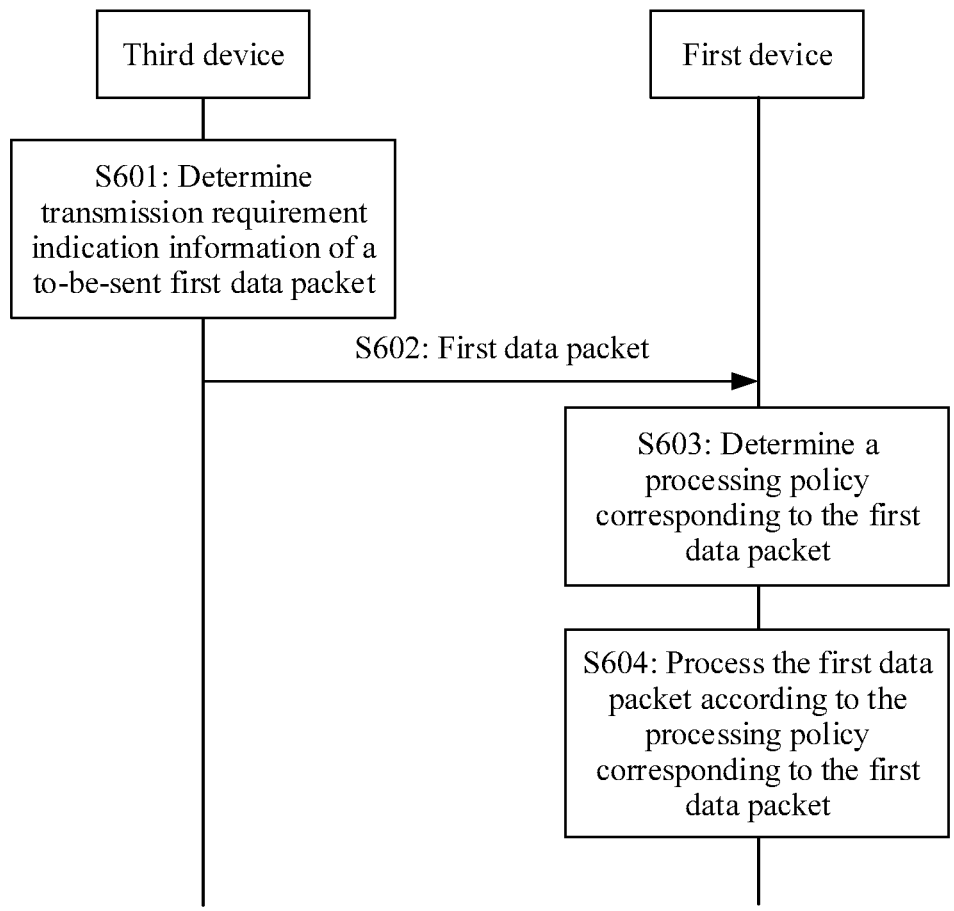
FIG. 6 is a schematic flowchart of a data transmission method according to an embodiment of this application.
FIG. 7 is a schematic diagram of a format of an extension header of a first data packet according to an embodiment of this application.

The following provides a data packet processing method according to an embodiment of this application using an example of interaction between a first device and a third device. As shown in FIG. 6, the method includes the following steps (it may be understood that there are one or more data packets in one service flow, and the following uses only a first data packet as an example for description).

S601: The third device determines transmission requirement indication information of the to-be-sent first data packet, where the transmission requirement indication information of the first data packet is used to determine, in a transmission process of the first data packet, a processing policy corresponding to the first data packet.

Optionally, in this embodiment of this application, the transmission requirement indication information of the first data packet may include a bit value of the first data packet, and the bit value of the first data packet is information used to represent a value of the first data packet.

Optionally, the bit value of the first data packet may be, for example, a sum of bit values of all data in the first data packet, a bit value of data with a highest bit value in the first data packet, a user-defined value used to represent the value of the first data packet, or the like. This is not specifically limited in this embodiment of this application.

Optionally, in this embodiment of this application, if the third device is the source device in FIG. 1, the source device may determine the bit value of the to-be-sent first data packet based on a data type of the first data packet. For example, the data type of the first data packet may be a P-frame data packet, an I-frame data packet, an I frame+P frame data packet, or the like. This is not specifically limited in this embodiment of this application.

For example, it is assumed that the predefined bit value of the data packet may be classified into two levels: a high bit value level and a low bit value level. If the first data packet includes only an I-frame (that is, the data type of the first data packet is the I-frame data packet), the source device may determine the bit value of the first data packet as the high bit value level. Alternatively, if the first data packet includes only a P-frame (that is, the data type of the first data packet is the P-frame data packet), the source device may determine the bit value of the first data packet as the low bit value level. Alternatively, if the first data packet includes both an I-frame and a P-frame (that is, the data type of the first data packet is the I-frame+P-frame data packet), the source device may determine the bit value of the first data packet, namely, a bit value of data with a highest bit value in the first data packet, as the high bit value level. Certainly, the high bit value level and the low bit value level may also be respectively represented by corresponding values. For example, the high bit value level corresponds to a first value, and the low bit value level corresponds to a second value, where the first value>the second value. This is not specifically limited in this embodiment of this application.

Certainly, in this embodiment of this application, if the third device is not the source device in FIG. 1 but an intermediate device in FIG. 1, the bit value of the to-be-sent first data packet is determined by the source device in the foregoing manner and then sent to the third device. This is not specifically limited in this embodiment of this application.

Optionally, in this embodiment of this application, the transmission requirement indication information of the first data packet may further include a transmission time parameter of the first data packet. The transmission time parameter of the first data packet is information used to represent time validity of the first data packet.

For example, assuming that the first data packet is a data packet of a delay-sensitive service, the transmission time parameter of the first data packet may be used to indicate a remaining processing time of the first data packet. The remaining processing time may be represented in the following manners.

Manner 1: In a case in which precise clock synchronization is required, the transmission time parameter of the first data packet may include a deadline corresponding to the first data packet. The deadline may be used to indicate the remaining processing time of the first data packet, and the remaining processing time=the deadline−a local timestamp. Precise clock synchronization refers to synchronization of absolute clocks between devices, such that an absolute time of each device is consistent. A general description is provided herein, and details are not described below again.

Manner 2: In a case in which precise clock synchronization is not required, the transmission time parameter of the first data packet may include a transmission delay requirement of the first data packet and a time that has been occupied by each intermediate device in a process of transmitting the first data packet from the source device to the first device. The transmission delay requirement of the first data packet and the time that has been occupied by each intermediate device in the process of transmitting the first data packet from the source device to the first device may be used to indicate the remaining processing time of the first data packet. The remaining processing time=the transmission delay requirement of the first data packet−a sum of times that have been occupied by all intermediate devices in the process of transmitting the first data packet from the source device to the first device.

Certainly, the remaining processing time of the first data packet may be represented in another manner. This is not specifically limited in this embodiment of this application.

Optionally, in this embodiment of this application, the third device may further duplicate the high-bit-value first data packet to obtain a plurality of first data packets, and then transmit the first data packets on a plurality of transmission paths, to ensure reliability of transmission. In this case, correspondingly, the transmission requirement indication information of the first data packet may further include deduplication information of the first data packet. The deduplication information of the first data packet may include a sequence number of the first data packet. Alternatively, the deduplication information of the first data packet includes a sequence number of the first data packet and information about a device that is to perform deduplication on the first data packet. This is not specifically limited in this embodiment of this application. For example, in this embodiment of this application, the device that is to perform deduplication on the first data packet may be, for example, a device for aggregating the plurality of first data packets, for example, the CDN server in FIG. 5. This is not specifically limited in this embodiment of this application.

It should be noted that, in this embodiment of this application, the transmission requirement indication information of the first data packet may include a plurality of pieces of information: the bit value of the first data packet, the transmission time parameter of the first data packet, and the deduplication information of the first data packet. For example, the transmission requirement indication information of the first data packet includes the bit value of the first data packet and the transmission time parameter of the first data packet. Alternatively, the transmission requirement indication information of the first data packet includes the bit value of the first data packet and the deduplication information of the first data packet. Alternatively, the transmission requirement indication information of the first data packet includes the transmission time parameter of the first data packet and the deduplication information of the first data packet. Alternatively, the transmission requirement indication information of the first data packet includes the bit value of the first data packet, the transmission time parameter of the first data packet, and the deduplication information of the first data packet. This is not specifically limited in this embodiment of this application.

S602: The third device sends the first data packet to the first device, and the first device receives the first data packet from the third device. The first data packet carries the transmission requirement indication information of the first data packet.

Optionally, in this embodiment of this application, after determining the transmission requirement indication information of the first data packet, the third device may encapsulate the transmission requirement indication information of the first data packet into an extension header of the first data packet. The extension header of the first data packet may be included in an IP extension header of the first data packet. Alternatively, a new encapsulation format may be used for encapsulation. This is not specifically limited in this embodiment of this application. For example, the extension header of the first data packet may be in a format shown in FIG. 7, and includes a bit value field, a transmission delay requirement field, a sequence number field, a field of information about a deduplication device, fields of identifiers of intermediate devices between the source device and the first device (for example, an identifier of an intermediate device 1, an identifier of an intermediate device 2, and the like in FIG. 7), and time parameter fields corresponding to the intermediate devices (for example, a time parameter 1 corresponding to the intermediate device 1, a time parameter 2 corresponding to the intermediate device 2, and the like in FIG. 7). The time parameter is used to represent a time that has been occupied by each intermediate device in a process of transmitting the first data packet from the source device to the first device.

It should be noted that, in this embodiment of this application, if the first data packet is a duplicated data packet, the sequence number field and the field of information about the deduplication device in FIG. 7 are valid; if the first data packet is not a duplicated data packet, the two fields are invalid. If the first data packet is a data packet of a delay-sensitive service, the fields of identifiers of intermediate devices and the time parameter fields corresponding to the intermediate devices in FIG. 7 are valid; if the first data packet is not a data packet of a delay-sensitive service, the two fields are invalid. Optionally, the intermediate devices in FIG. 7 may be sorted based on a sequence along a path, for example, sorted in descending order of distances from the first device. This is not specifically limited in this embodiment of this application.

S603: The first device determines, based on the transmission requirement indication information of the first data packet, the processing policy corresponding to the first data packet.

Case 1: The transmission requirement indication information of the first data packet includes the bit value of the first data packet.

Optionally, in this embodiment of this application, that the first device determines, based on the transmission requirement indication information of the first data packet, the processing policy corresponding to the first data packet may be: if the bit value of the first data packet is greater than a first threshold, the first device determines that the processing policy corresponding to the first data packet is preferentially scheduling the first data packet.

In addition/alternatively, the first device forwards the first data packet to a second device. The second device is a device with a minimum congestion degree in next-hop devices adjacent to the first device on one or more transmission paths from the first device to a target device. Alternatively, the second device is a next-hop device adjacent to the first device on a target transmission path from the first device to a target device. The target transmission path is a transmission path with a minimum transmission cost in one or more transmission paths from the first device to the target device.

In addition/alternatively, the first device duplicates the first data packet to obtain a plurality of first data packets, and sends the plurality of first data packets on a plurality of transmission paths. Alternatively, the first device duplicates the first data packet to obtain a plurality of first data packets, and sends the plurality of first data packets on a plurality of transmission paths. The first data packet includes a sequence number of the first data packet and information about a device that is to perform deduplication on the first data packet. In other words, in this manner, a device that is to perform deduplication on the first data packet needs to be specified on each of the plurality of transmission paths.

Alternatively, if the bit value of the first data packet is less than a second threshold, and devices on one or more transmission paths between the first device and a target device are congested, the first device determines that the processing policy corresponding to the first data packet is to discard the first data packet, to reserve a resource for another data packet.

In this embodiment of this application, preferential scheduling means inserting the received data packet into the forefront of a scheduling queue, such that the data packet can be processed in advance. A general description is provided herein, and details are not described below again.

In this embodiment of this application, for a manner of obtaining a congestion degree of each device, refer to the foregoing transmission network introduction part. Details are not described herein again.

In this embodiment of this application, the minimum transmission cost may be, for example, a shortest transmission path or a minimum transmission delay. A general description is provided herein, and details are not described below again.

Case 2: The transmission requirement indication information of the first data packet includes the transmission time parameter of the first data packet.

Optionally, in this embodiment of this application, the transmission time parameter of the first data packet is used to indicate a remaining processing time of the first data packet. Correspondingly, that the first device determines, based on the transmission requirement indication information of the first data packet, the processing policy corresponding to the first data packet is: if the remaining processing time of the first data packet is less than a third threshold and is greater than 0, the first device determines that the processing policy corresponding to the first data packet is preferentially scheduling the first data packet.

In addition/alternatively, the first device forwards the first data packet to a second device. The second device is a device with a minimum congestion degree in next-hop devices adjacent to the first device on one or more transmission paths from the first device to a target device. Alternatively, the second device is a next-hop device adjacent to the first device on a target transmission path from the first device to a target device. The target transmission path is a transmission path with a minimum transmission cost in one or more transmission paths from the first device to the target device.

In this embodiment of this application, for a manner of obtaining a congestion degree of each device, refer to the foregoing transmission network introduction part. Details are not described herein again.

In this embodiment of this application, the remaining processing time of the first data packet is greater than 0. For example, the remaining processing time of the first data packet may be greater than a transmission delay from the first device to a next-hop device of the first device. This is not specifically limited in this embodiment of this application.

Alternatively, if the remaining processing time of the first data packet is not greater than 0 or is not greater than an estimated time, the first device determines that the processing policy corresponding to the first data packet is discarding the first data packet, to reserve a resource for another data packet. The estimated time is determined based on a congestion degree of each device on one or more transmission paths between the first device and a target device.

In this embodiment of this application, the remaining processing time of the first data packet is not greater than 0. For example, the remaining processing time of the first data packet may be not greater than a transmission delay from the first device to a next-hop device of the first device. This is not specifically limited in this embodiment of this application.

Case 3: The transmission requirement indication information of the first data packet includes the deduplication information of the first data packet.

Optionally, in this embodiment of this application, that the first device determines, based on the transmission requirement indication information of the first data packet, the processing policy corresponding to the first data packet is: If the information, about the device that is to perform deduplication on the first data packet, included in the deduplication information of the first data packet is information about the first device, the first device determines that the processing policy corresponding to the first data packet is performing deduplication on the first data packet based on the sequence number of the first data packet. In other words, if the first device learns that the specified device that is to perform deduplication is the first device, the first device may perform deduplication based on the sequence number of the first data packet.

It should be noted that, the foregoing case 1 to case 3 respectively provide corresponding processing policies when the transmission requirement indication information of the first data packet includes one of the bit value of the first data packet, the transmission time parameter of the first data packet, or the deduplication information of the first data packet. Certainly, if the transmission requirement indication information of the first data packet includes a plurality of pieces of information: the bit value of the first data packet, the transmission time parameter of the first data packet, and the deduplication information of the first data packet, a corresponding processing policy may be a combination of the processing policies in case 1 to case 3. For example, it is assumed that the transmission requirement indication information of the first data packet includes the bit value of the first data packet and the deduplication information of the first data packet, the bit value of the first data packet is greater than a first threshold, and the information, about the device that is to perform deduplication on the first data packet, included in the deduplication information of the first data packet is information about the first device. In this case, the first device determines that the processing policy corresponding to the first data packet is: performing deduplication processing on the first data packet based on a sequence number of the first data packet, and forwarding the first data packet to a second device. The second device is a device with a minimum congestion degree in next-hop devices adjacent to the first device on one or more transmission paths from the first device to a target device. Alternatively, the second device is a next-hop device adjacent to the first device on a target transmission path from the first device to a target device.

S604: The first device processes the first data packet according to the processing policy corresponding to the first data packet.

After determining the processing policy corresponding to the first data packet, the first device may process the first data packet according to the foregoing processing policy, for example, one or more of the following processing: deduplication, duplication, active discarding, preferential scheduling, or forwarding the first data packet to a next-hop device of the first device. For details, refer to the processing policy described in step S603. Details are not described herein again.

According to the data transmission method provided in this embodiment of this application, in a data transmission process, the first data packet received by the first device carries the transmission requirement indication information of the first data packet, such that the first device may determine, based on the transmission requirement indication information of the first data packet, the processing policy corresponding to the first data packet, and then process the first data packet according to the processing policy corresponding to the first data packet. Therefore, in this embodiment of this application, different processing can be performed on data packets of varying degrees of importance in a same service flow based on the transmission requirement indication information of the first data packet.

Actions of the first device or the third device in steps S601 to S604 may be performed by the processor 201 in the communications device 200 shown in FIG. 2 by invoking the application program code stored in the memory 203. This is not limited in this embodiment.

The following describes the data processing method provided in the foregoing embodiment of this application with reference to several scenarios.

EXAMPLE 1

Figure 8:
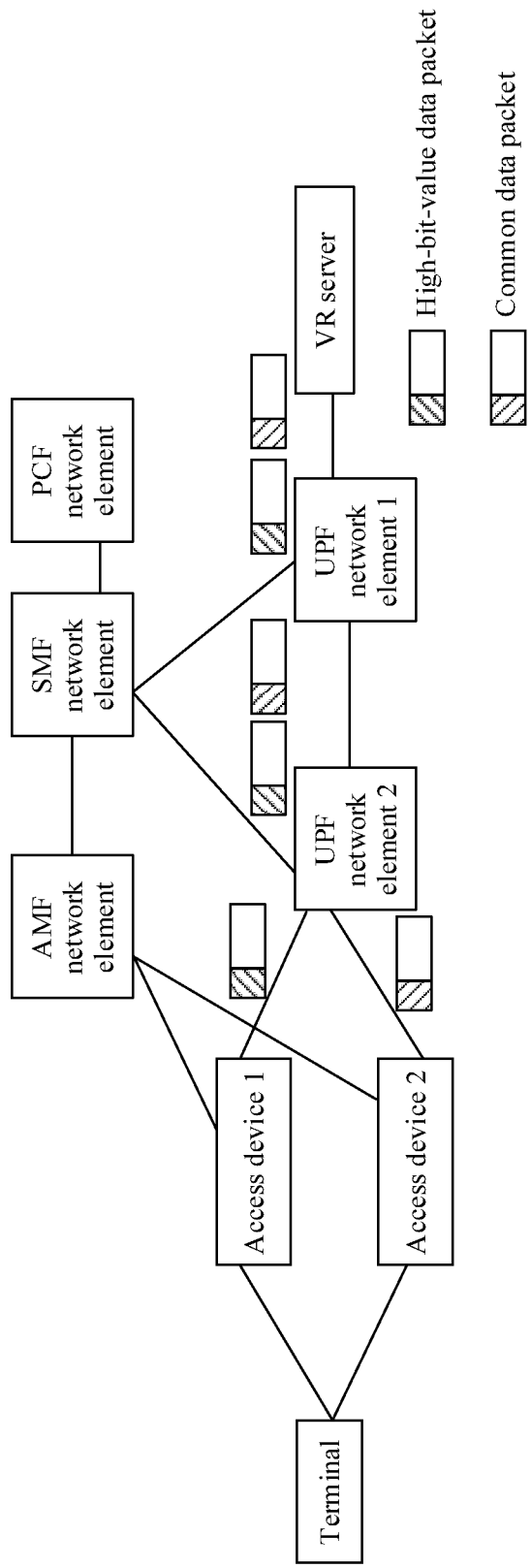
FIG. 8 is a schematic diagram 1 of an application scenario of a processing and transmission method according to an embodiment of this application.

This example mainly describes how to process a high-bit-value data packet and a common data packet in a mobile network. A virtual reality (VR) service is used as an example, as shown in FIG. 8.

First, it is assumed that a VR server sends a plurality of data packets to a terminal. The plurality of data packets include data of an I-frame or a P-frame. If the data packet includes I-frame data, the VR server sets a bit value in a header of the data packet to a high bit value. In other words, the data packet is considered as a high-bit-value data packet. If the data packet includes P-frame data, the data packet is processed as a common data packet.

Second, after a user plane function (UPF) network element 1 receives a high-bit-value data packet sent by the VR server, the UPF network element 1 identifies a bit value in a header of the data packet, and learns that the data packet is a high-bit-value data packet. Then, the UPF network element 1 performs preferential scheduling, and sets a bit value in an IP header of a tunnel (for example, a general packet radio system (GPRS) tunneling protocol (GTP) tunnel) encapsulated at an outer layer of the data packet to a high bit value. Then, the UPF network element 1 sends the encapsulated high-bit-value data packet to a user plane function (UPF) network element 2.

Further, after receiving the high-bit-value data packet, the UPF network element 2 learns, based on the bit value in the IP header of the tunnel encapsulated at the outer layer of the data packet, that the data packet is a high-bit-value data packet. Then, the UPF network element 2 performs preferential scheduling, sets the bit value in the IP header of the tunnel (for example, the GTP tunnel) encapsulated at the outer layer of the data packet to a high bit value, and selects a light-loaded access device to send the high-bit-value data packet. Optionally, the UPF network element 2 may select an access device in the following manners: For example, a session management function (SMF) network element may select, based on load of access devices, an access device that processes a high-bit-value data packet, and notify the UPF network element of information about the selected access device. Alternatively, an access device may feed back load of the access device to the UPF network element 2, and the UPF network element 2 selects an access device. This is not specifically limited in this embodiment of this application. Assuming that load of an access device 1 in FIG. 8 is smaller than load of an access device 2, the UPF network element 2 may send the high-bit-value data packet through the access device 1, and send a common data packet through the access device 2.

After the access device 1 and the access device 2 respectively receive corresponding data packets, different scheduling may be performed and different QoS parameters may be used based on a bit value in a header of the data packet, to ensure preferential scheduling of a high-bit-value data packet. For details, refer to "a burst assurance mechanism is used for a high-bit-value data packet" in an existing 3rd generation partnership project (3GPP) mechanism. Details are not described herein.

EXAMPLE 2

This example mainly describes how to implement logical isolation between slices for a high-bit-value data packet in a shared network scenario using the mechanism. Different slices carry data packets of different bit values.

Figure 9:
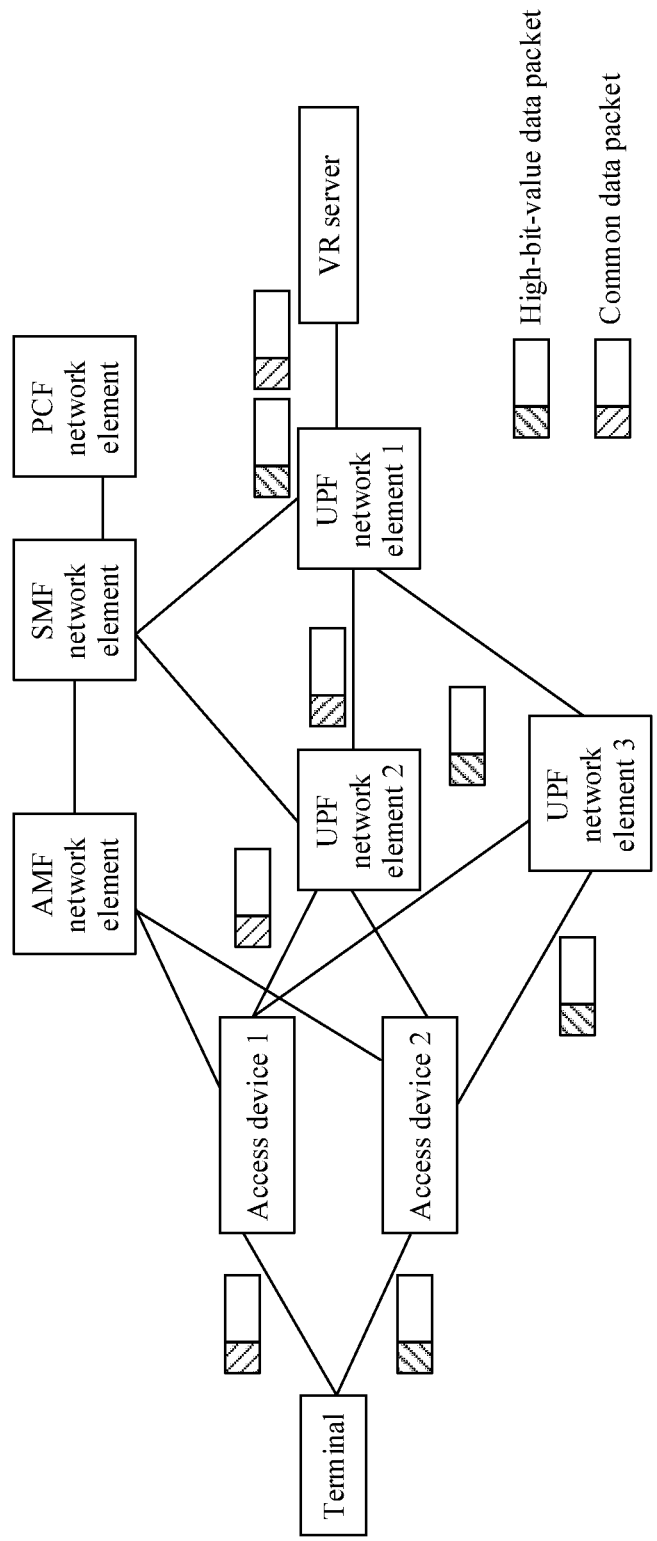
FIG. 9 is a schematic diagram 2 of an application scenario of a processing and transmission method according to an embodiment of this application.

As shown in FIG. 9, for a downlink data packet from an application server to a terminal:

First, it is assumed that the application server sends a plurality of data packets to the terminal. The plurality of data packets include data of an I-frame or a P-frame. If the data packet includes I-frame data, the application server sets a bit value in a header of the data packet to a high bit value. In other words, the data packet is considered as a high-bit-value data packet. If the data packet includes P-frame data, the data packet is processed as a common data packet.

Second, after a UPF network element 1 receives a high-bit-value data packet sent by the application server, the UPF network element 1 identifies a bit value in a header of the data packet, and learns that the data packet is a high-bit-value data packet. Then, the UPF network element 1 performs preferential scheduling, and sets a bit value in an IP header of a tunnel (for example, a GTP tunnel) encapsulated at an outer layer of the data packet to a high bit value. Then, the UPF network element 1 sends the encapsulated high-bit-value data packet to a UPF network element 3 according to a forwarding policy. After receiving a common data packet sent by the application server, the UPF network element 1 may encapsulate the common data packet according to the forwarding policy and then send the encapsulated common data packet to a UPF network element 2. The forwarding policy on the UPF network element 1 may be delivered by an SMF network element, or may be determined by the UPF network element 1 based on congestion degrees fed back by the UPF network element 2 and the UPF network element 3. This is not specifically limited in this embodiment of this application.

Further, after receiving the high-bit-value data packet, the UPF network element 3 learns, based on the bit value in the IP header of the tunnel encapsulated at the outer layer of the data packet, that the data packet is a high-bit-value data packet. Then, the UPF network element 3 performs preferential scheduling, sets the bit value in the IP header of the tunnel (for example, the GTP tunnel) encapsulated at the outer layer of the data packet to a high bit value, and selects a light-loaded access device to send the high-bit-value data packet. For a manner of selecting an access device, refer to the foregoing example 1. Details are not described herein again. Assuming that load of an access device 2 in FIG. 9 is smaller than load of an access device 1, the UPF network element 3 may send the high-bit-value data packet through the access device 2. After receiving the high-bit-value data packet, the access device 2 may perform high-priority-first scheduling and use a particular QoS parameter for assurance based on a bit value in a header of the data packet. For details, refer to "a burst assurance mechanism is used for a high-bit-value data packet" in an existing 3GPP mechanism. Details are not described herein. Further, the access device 2 may send the high-bit-value data packet to the terminal.

Alternatively, after receiving a common data packet, the UPF network element 2 may send the common data packet to the terminal according to an existing mechanism. For example, as shown in FIG. 9, the UPF network element 2 may send the common data packet to the terminal through the access device 1.

Certainly, for an uplink data packet from the terminal to the application server:

The terminal may encapsulate a bit value of the data packet in a header of the data packet, and then the terminal may select, based on an air interface measurement parameter and the like, the access device 2 with good channel quality to send the high-bit-value data packet. After receiving the high-bit-value data packet, the access device 2 may learn, based on the bit value in the header of the data packet, that the data packet is a high-bit-value data packet. Then, the access device 2 may set the bit value in an IP header of a tunnel (for example, a GTP tunnel) encapsulated at an outer layer of the data packet to a high bit value, and send the encapsulated high-bit-value data packet to the UPF network element 3. After receiving the high-bit-value data packet, the UPF network element 3 learns, based on the bit value in the IP header of the tunnel encapsulated at the outer layer of the data packet, that the data packet is a high-bit-value data packet. Then, the UPF network element 3 implements high-priority assurance, for example, performs preferential scheduling. For details, refer to "a burst assurance mechanism is used for a high-bit-value data packet" in an existing 3GPP mechanism. Details are not described herein.

It should be noted that the foregoing example 1 and example 2 are mainly oriented to the mobile network, and therefore, load of an access device is an important factor to be considered. In the current 3GPP, an access device notifies a control plane (for example, the SMF network element) of load of the access device. Therefore, implementation of a network node (for example, the UPF network element) is simplified, and different forwarding policies may be performed based on an indication of the SMF. For example, in the foregoing example 1, the SMF network element may select, based on load of access devices, an access device that processes high-bit-value data packet, and notify the UPF network element of information about the selected access device. Then, the UPF network element may send a high-bit-value data packet to the access device. A general description is provided herein, and details are not described below again.

Figure 10:
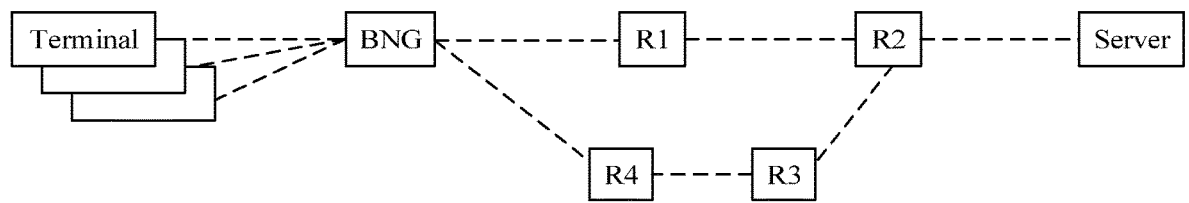
FIG. 10 is a schematic diagram 3 of an application scenario of a processing and transmission method according to an embodiment of this application.

Example 3: Compared with a wireless network, in scenarios such as an enterprise network and a fixed network, because there is no control plane, a network node needs to actively learn a network topology and perceive a load change of each network node. It is assumed that a broadband network gateway (BNG), a router 1 (R1), a router 2 (R2), a router 3 (R3), a router 4 (R4), and a server in FIG. 10 may be enabled, using the OSPF protocol, to establish transmission path topology information for an IP section pair. In addition, each network node may obtain a congestion degree of each network node in a manner of multicast, and notification or sampling by a neighboring node in the foregoing transmission network introduction part. Operations of each device on the transmission path topology are separately described as follows:

The server or the terminal may encapsulate one or more of a bit value of the data packet, a transmission time parameter of the data packet, or deduplication information of the data packet into a header of the data packet according to a format.

Routers (for example, R2 and R1, or R2, R3, and R4) between the server and the terminal may update the transmission time parameter of the data packet or the deduplication information of the data packet in the header of the data packet along the path.

The BNG, the routers between the server and the terminal (for example, R2 and R1, or R2, R3, and R4), or the server may perform priority-based scheduling based on the bit value of the data packet or perform multi-path concurrent transmission, and perform time validity check on a delay-sensitive service flow. If a validity period expires, the data packet is discarded.

The foregoing mainly describes the solutions provided in the embodiments of this application from a perspective of interaction between network elements. It may be understood that to implement the foregoing functions, the first device or the third device include corresponding hardware structures and/or software modules for performing the functions. A person skilled in the art should be aware that, in combination with units and algorithm steps of the examples described in the embodiments disclosed in this specification, this application may be implemented by hardware or a combination of hardware and computer software. Whether a function is performed using hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first device or the third device may be divided into functional modules based on the foregoing method examples. For example, the functional modules may be obtained through division based on corresponding functions, or two or more functions may be integrated into one processing module. The integrated module may be implemented in a form of hardware, or may be implemented in a form of a software functional module. It should be noted that, in the embodiments of this application, division into modules is an example, and is merely logical function division. There may be another division manner in actual implementation.

Figure 11:
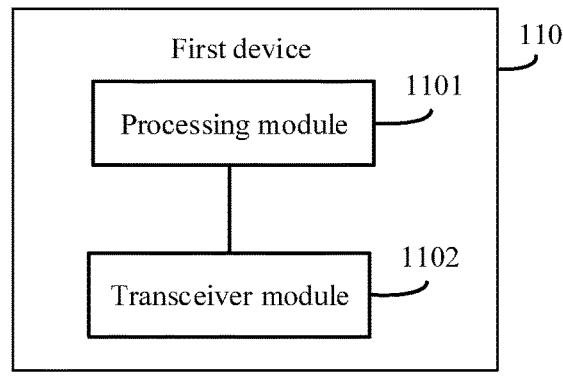
FIG. 11 is a schematic structural diagram of a first device according to an embodiment of this application.

For example, if functional modules are obtained through division in an integrated manner, FIG. 11 is a schematic structural diagram of a first device 110. The first device 110 includes a transceiver module 1102 and a processing module 1101. The transceiver module 1102 is configured to receive a first data packet from a third device. The first data packet carries transmission requirement indication information of the first data packet. The first device 110 is any intermediate device between a source device and a target device that correspond to the first data packet, and the third device is a previous-hop device adjacent to the first device 110 on a transmission path from the source device to the target device. The processing module 1101 is configured to: determine, based on the transmission requirement indication information of the first data packet, a processing policy corresponding to the first data packet; and process the first data packet according to the processing policy corresponding to the first data packet.

Optionally, the transmission requirement indication information of the first data packet includes a bit value of the first data packet, and the bit value of the first data packet is information used to represent a value of the first data packet.

For example, the bit value of the first data packet may be a sum of bit values of all data in the first data packet, a bit value of data with a highest bit value in the first data packet, or a user-defined value used to represent the value of the first data packet.

Further, in a possible implementation, that the processing module 1101 is configured to determine, based on the transmission requirement indication information of the first data packet, the processing policy corresponding to the first data packet is: if the bit value of the first data packet is greater than a first threshold, determining that the processing policy corresponding to the first data packet is preferentially scheduling the first data packet.

Alternatively, in a possible implementation, that the processing module 1101 is configured to determine, based on the transmission requirement indication information of the first data packet, the processing policy corresponding to the first data packet is: if the bit value of the first data packet is greater than a first threshold, determining that the processing policy corresponding to the first data packet is forwarding the first data packet to the second device. The second device is a device with a minimum congestion degree in next-hop devices adjacent to the first device 110 on one or more transmission paths from the first device 110 to the target device. Alternatively, the second device is a next-hop device adjacent to the first device 110 on a target transmission path from the first device 110 to the target device. The target transmission path is a transmission path with a minimum transmission cost in one or more transmission paths from the first device 110 to the target device.

Alternatively, in a possible implementation, that the processing module 1101 is configured to determine, based on the transmission requirement indication information of the first data packet, the processing policy corresponding to the first data packet is: if the bit value of the first data packet is greater than a first threshold, determining that the processing policy corresponding to the first data packet is: duplicating the first data packet to obtain a plurality of first data packets, and sending the plurality of first data packets on a plurality of transmission paths; or duplicating the first data packet to obtain a plurality of first data packets, sending the plurality of first data packets on a plurality of transmission paths, and specifying a device that is to perform deduplication on the first data packet on each of the plurality of transmission paths.

Alternatively, in a possible implementation, that the processing module 1101 is configured to determine, based on the transmission requirement indication information of the first data packet, the processing policy corresponding to the first data packet is: if the bit value of the first data packet is less than a second threshold, and devices on one or more transmission paths between the first device 110 and the target device are congested, determining that the processing policy corresponding to the first data packet is discarding the first data packet.

Optionally, the transmission requirement indication information of the first data packet includes a transmission time parameter of the first data packet. The transmission time parameter of the first data packet is information used to represent time validity of the first data packet.

Further, in a possible implementation, the transmission time parameter of the first data packet is used to indicate a remaining processing time of the first data packet. Correspondingly, that the processing module 1101 is configured to determine, based on the transmission requirement indication information of the first data packet, the processing policy corresponding to the first data packet is: if the remaining processing time of the first data packet is less than a third threshold and is greater than 0, determining that the processing policy corresponding to the first data packet is preferentially scheduling the first data packet.

Alternatively, in a possible implementation, the transmission time parameter of the first data packet is used to indicate a remaining processing time of the first data packet. Correspondingly, that the processing module 1101 is configured to determine, based on the transmission requirement indication information of the first data packet, the processing policy corresponding to the first data packet is: if the remaining processing time of the first data packet is less than a third threshold and is greater than 0, determining that the processing policy corresponding to the first data packet is forwarding the first data packet to the second device. The second device is a device with a minimum congestion degree in next-hop devices adjacent to the first device 110 on one or more transmission paths from the first device 110 to the target device. Alternatively, the second device is a next-hop device adjacent to the first device 110 on a target transmission path from the first device 110 to the target device. The target transmission path is a transmission path with a minimum transmission cost in one or more transmission paths from the first device 110 to the target device.

Alternatively, in a possible implementation, the transmission time parameter of the first data packet is used to indicate a remaining processing time of the first data packet. Correspondingly, that the processing module 1101 is configured to determine, based on the transmission requirement indication information of the first data packet, the processing policy corresponding to the first data packet is: if the remaining processing time of the first data packet is not greater than 0 or is not greater than an estimated time, determining that the processing policy corresponding to the first data packet is discarding the first data packet. The estimated time is determined based on a congestion degree of each device on one or more transmission paths between the first device 110 and the target device.

Optionally, the transmission requirement indication information of the first data packet further includes deduplication information of the first data packet. The deduplication information of the first data packet includes a sequence number of the first data packet. Alternatively, the deduplication information of the first data packet includes a sequence number of the first data packet and information about a device that is to perform deduplication on the first data packet.

Further, in a possible implementation, that the processing module 1101 is configured to determine, based on the transmission requirement indication information of the first data packet, the processing policy corresponding to the first data packet is: if information, about the device that is to perform deduplication on the first data packet, included in the deduplication information of the first data packet is information about the first device 110, determining that the processing policy corresponding to the first data packet is performing deduplication on the first data packet based on the sequence number of the first data packet.

Optionally, the processing module 1101 is further configured to obtain information and the congestion degree of each device on one or more transmission paths between the first device 110 and the target device. The processing module 1101 is further configured to establish a correspondence between the information and the congestion degree of each device on one or more transmission paths between the first device 110 and the target device.

Optionally, that the processing module 1101 is configured to obtain the information and the congestion degree of each device on one or more transmission paths between the first device 110 and the target device is: receiving, from a control device, the congestion degree of the device on one or more transmission paths between the first device 110 and the target device; or receiving, from each device on one or more transmission paths between the first device 110 and the target device, the congestion degree of each device.

All related content of the steps in the foregoing method embodiments may be cited in function descriptions of corresponding functional modules. Details are not described herein again.

In this embodiment, the first device 110 is presented in a form of functional modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the first device 110 may be in a form shown in FIG. 2.

For example, the processor 201 in FIG. 2 may invoke a computer-executable instruction stored in the memory 203, to enable the first device 110 to perform the data processing method in the foregoing method embodiments.

Functions/implementation processes of the transceiver module 1102 and the processing module 1101 in FIG. 11 may be implemented by the processor 201 in FIG. 2 by invoking the computer-executable instruction stored in the memory 203. Alternatively, functions/implementation processes of the processing module 1101 in FIG. 11 may be implemented by the processor 201 in FIG. 2 by invoking the computer-executable instruction stored in the memory 203, and functions/implementation processes of the transceiver module 1102 in FIG. 11 may be implemented by the communications interface 204 in FIG. 2.

The first device provided in this embodiment can perform the foregoing data processing method. Therefore, for a technical effect that can be achieved by the first device, refer to descriptions in the foregoing method embodiments. Details are not described herein again.

Optionally, an embodiment of this application further provides an apparatus (for example, the apparatus may be a chip system). The apparatus includes a processor, configured to support a first device in implementing the foregoing data processing method, for example, determining, based on transmission requirement indication information of a first data packet, a processing policy corresponding to the first data packet. In a possible design, the apparatus further includes a memory. The memory is configured to store a program instruction and data that are necessary for the first device. Certainly, the memory may alternatively be not in the apparatus. When the apparatus is a chip system, the apparatus may include a chip, or may include a chip and another discrete device. This is not specifically limited in this embodiment of this application.

Figure 12:
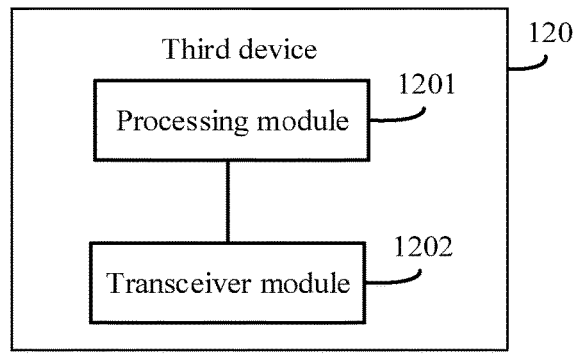
FIG. 12 is a schematic structural diagram of a third device according to an embodiment of this application.

For example, if functional modules are obtained through division in an integrated manner, FIG. 12 is a schematic structural diagram of a third device 120. The third device 120 includes a processing module 1201 and a transceiver module 1202. The processing module 1201 is configured to determine transmission requirement indication information of a to-be-sent first data packet. The transmission requirement indication information of the first data packet is used to determine, in a transmission process of the first data packet, a processing policy corresponding to the first data packet. The transceiver module 1202 is configured to send the first data packet to a first device. The first data packet carries the transmission requirement indication information of the first data packet. The first device is any intermediate device between a source device and a target device that correspond to the first data packet, and the third device is a previous-hop device adjacent to the first device on a transmission path from the source device to the target device.

Optionally, the third device is the source device corresponding to the first data packet. Correspondingly, processing module 1201 is configured to determine the transmission requirement indication information of the first data packet by determining a bit value of the first data packet based on a data type of the first data packet.

All related content of the steps in the foregoing method embodiments may be cited in function descriptions of corresponding functional modules. Details are not described herein again.

In this embodiment, the third device 120 is presented in a form of functional modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the third device 120 may be in a form shown in FIG. 2.

For example, the processor 201 in FIG. 2 may invoke a computer-executable instruction stored in the memory 203, to enable the third device 120 to perform the data processing method in the foregoing method embodiments.

Functions/implementation processes of the transceiver module 1202 and the processing module 1201 in FIG. 12 may be implemented by the processor 201 in FIG. 2 by invoking the computer-executable instruction stored in the memory 203. Alternatively, functions/implementation processes of the processing module 1201 in FIG. 12 may be implemented by the processor 201 in FIG. 2 by invoking the computer-executable instruction stored in the memory 203, and functions/implementation processes of the transceiver module 1202 in FIG. 12 may be implemented by the communications interface 204 in FIG. 2.

The third device provided in this embodiment can perform the foregoing data processing method. Therefore, for a technical effect that can be achieved by the first device, refer to descriptions in the foregoing method embodiments. Details are not described herein again.

Optionally, an embodiment of this application further provides an apparatus (for example, the apparatus may be a chip system). The apparatus includes a processor, configured to support a third device in implementing the foregoing data processing method, for example, determining, based on transmission requirement indication information of a first data packet, a processing policy corresponding to the first data packet. In a possible design, the apparatus further includes a memory. The memory is configured to store a program instruction and data that are necessary for the third device. Certainly, the memory may alternatively be not in the apparatus. When the apparatus is a chip system, the apparatus may include a chip, or may include a chip and another discrete device. This is not specifically limited in this embodiment of this application.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer instructions are loaded and executed on a computer, the procedure or functions according to the embodiments of this application are completely or partially generated. The computer may be a general-purpose computer, a special-purpose computer, a computer network, or another programmable apparatus. The computer instructions may be stored in a computer-readable storage medium, or may be transmitted from one computer-readable storage medium to another computer-readable storage medium. For example, the computer instructions may be transmitted from a website, a computer, a server or a data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprise" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to example features and the embodiments thereof, it is clear that various modifications and combinations may be made to them without departing from the scope of this application. Correspondingly, the specification and the accompanying drawings are merely example description of this application defined by the appended claims, and are considered as any of or all modifications, variations, combinations or equivalents that cover the scope of this application. A person skilled in the art can make various modifications and variations to this application without departing from the spirit and scope of this application. This application is intended to cover the modifications and variations of this application provided that they fall within the scope of the claims of this application and their equivalent technologies.

What is claimed is:

1. A data processing method, comprising:
   receiving, by a first device, a first data packet from a third device, wherein the first data packet carries transmission requirement indication information of the first data packet, wherein the first device is any intermediate device on a transmission path of the first packet, wherein the transmission path is between a source device and a target device, and wherein the third device is a previous-hop device adjacent to the first device on the transmission path from the source device to the target device;
   determining, by the first device based on the transmission requirement indication information, a processing policy corresponding to the first data packet, wherein the transmission requirement indication information comprises a bit value of the first data packet, and wherein the bit value represents a value of the first data packet;
   determining, by the first device when the bit value of the first data packet is greater than a first threshold, that the processing policy includes:
      duplicating the first data packet to obtain a plurality of first data packets, and sending the plurality of first data packets on a plurality of transmission paths; or
      forwarding the first data packet to a second device, wherein the second device is one of a device with a minimum congestion degree in next-hop devices adjacent to the first device on one or more transmission paths from the first device to the target device, or a next-hop device adjacent to the first device on a target transmission path with a minimum transmission cost in the one or more transmission paths from the first device to the target device; and
   processing, by the first device, the first data packet according to the processing policy.

2. The data processing method of claim 1, wherein the bit value is a sum of bit values of all data in the first data packet.

3. The data processing method of claim 1, wherein the bit value is a user-defined value representing the value of the first data packet.

4. The data processing method of claim 1, wherein the bit value is a bit value of data with a highest bit value in the first data packet.

5. The data processing method of claim 1, wherein determining the processing policy comprises determining, by the first device when the bit value of the first data packet is greater than the first threshold, that the processing policy further includes specifying a device that is to perform deduplication on the first data packet on each of the plurality of transmission paths.

6. The data processing method of claim 1, wherein the transmission requirement indication information further comprises a transmission time parameter of the first data packet, and wherein the transmission time parameter represents time validity of the first data packet.

7. The data processing method of claim 6, wherein the transmission time parameter indicates a remaining processing time of the first data packet, and wherein determining the processing policy comprises determining, by the first device when the remaining processing time of the first data packet is less than a third threshold and greater than 0, that the processing policy includes forwarding the first data packet to the second device.

8. The data processing method of claim 6, wherein the transmission time parameter indicates a remaining processing time of the first data packet, wherein determining the processing policy comprises determining, by the first device when the remaining processing time of the first data packet is not greater than 0 or an estimated time, that the processing policy includes discarding the first data packet, and wherein the estimated time is determined based on a congestion degree of each device on one or more transmission paths between the first device and the target device.

9. The data processing method of claim 1, further comprising obtaining, by the first device, information and a congestion degree of each device on one or more transmission paths between the first device and the target device.

10. A first device, comprising:
at least one processor; and
a memory coupled to the at least one processor and having program instructions stored thereon which, when executed by the at least one processor, cause the first device to:
  receive a first data packet from a third device, wherein the first data packet carries transmission requirement indication information of the first data packet, wherein the first device is any intermediate device on a transmission path of the first packet, wherein the transmission path is between a source device and a target device, and wherein the third device is a previous-hop device adjacent to the first device on the transmission path from the source device to the target device;
  determine, based on the transmission requirement indication information, a processing policy corresponding to the first data packet, wherein the transmission requirement indication information comprises a bit value of the first data packet, and wherein the bit value represents a value of the first data packet;
  determine, when the bit value of the first data packet is greater than a first threshold, that the processing policy includes:
    duplicating the first data packet to obtain a plurality of first data packets, and sending the plurality of first data packets on a plurality of transmission paths; or
    forwarding the first data packet to a second device, wherein the second device is one of a device with a minimum congestion degree in next-hop devices adjacent to the first device on one or more transmission paths from the first device to the target device, or a next-hop device adjacent to the first device on a target transmission path with a minimum transmission cost in the one or more transmission paths from the first device to the target device; and
  process the first data packet according to the processing policy.

11. The first device of claim 10, wherein the bit value is a sum of bit values of all data in the first data packet.

12. The first device of claim 10, wherein the bit value of the first data packet is a user-defined value representing the value of the first data packet.

13. The first device claim 10, wherein the bit value is a bit value of data with a highest bit value in the first data packet.

14. The first device of claim 10, wherein the program instructions, when executed by the at least one processor, further cause the first device to determine, when the bit value of the first data packet is greater than the first threshold, that the processing policy further includes specifying a device that is to perform deduplication on the first data packet on each of the plurality of transmission paths.

15. The first device of claim 10, wherein the transmission requirement indication information further comprises a transmission time parameter of the first data packet, and wherein the transmission time parameter represents time validity of the first data packet.

16. The first device of claim 15, wherein the transmission time parameter indicates a remaining processing time of the first data packet, wherein the program instructions, when executed by the at least one processor, further cause the first device to determine, when the remaining processing time of the first data packet is less than a third threshold and greater than 0, that the processing policy includes forwarding the first data packet to the second device.

17. The first device of claim 15, wherein the transmission time parameter indicates a remaining processing time of the first data packet, wherein the program instructions, when executed by the at least one processor, further cause the first device to determine, when the remaining processing time of the first data packet is not greater than 0 or an estimated time, that the processing policy includes discarding the first data packet, and wherein the estimated time is determined based on a congestion degree of each device on one or more transmission paths between the first device and the target device.

18. The first device of claim 10, wherein the program instructions, when executed by the at least one processor, further cause the first device to obtain information and a congestion degree of each device on one or more transmission paths between the first device and the target device.

19. The first device of claim 18, wherein the program instructions, when executed by the at least one processor, further cause the first device to establish a correspondence between the information and the congestion degree of each device on one or more transmission paths between the first device and the target device.

20. The data processing method of claim 9, further comprising establishing, by the first device, a correspondence between the information and the congestion degree of each device on one or more transmission paths between the first device and the target device.

* * * * *